United States Patent [19]

Starr, Jr. et al.

[11] Patent Number: 5,025,659

[45] Date of Patent: Jun. 25, 1991

[54] SLOTTED-WALL EXTENSION AND METHOD FOR ENVIRONMENTAL WIND TUNNELS

[75] Inventors: Rogers F. Starr, Jr., Manchester; Lakhi N. Goenka, Tullahoma, both of Tenn.

[73] Assignee: Sverdrup Technology, Inc., Tullahoma, Tenn.

[21] Appl. No.: 406,478

[22] Filed: Sep. 13, 1989

[51] Int. Cl.$^5$ ............................................. G01M 9/00
[52] U.S. Cl. ...................................... 73/147; 73/865.6
[58] Field of Search ................................. 73/147, 865.6

[56] References Cited

U.S. PATENT DOCUMENTS

| | | |
|---|---|---|
| 2,625,038 | 1/1953 | Jackson . |
| 3,003,579 | 10/1961 | Weiss ............................. 182/36 |
| 3,180,140 | 4/1965 | Mickey . |
| 3,552,202 | 1/1971 | Kroeger et al. . |
| 3,817,082 | 6/1974 | Fletcher et al. . |
| 3,853,003 | 12/1974 | Sorensen ........................ 73/147 |
| 3,903,740 | 9/1975 | Baldwin . |
| 4,308,748 | 1/1982 | Jacocks ........................ 73/147 |
| 4,513,610 | 4/1985 | Nelander . |
| 4,750,355 | 6/1988 | Urabe et al. . |
| 4,751,844 | 6/1988 | Matsushita ..................... 73/147 |

FOREIGN PATENT DOCUMENTS

| | | |
|---|---|---|
| 2820439 | 11/1978 | Fed. Rep. of Germany ........ 73/147 |
| 3404696 | 8/1985 | Fed. Rep. of Germany ........ 73/147 |
| 1575406 | 9/1980 | United Kingdom ................. 73/147 |

OTHER PUBLICATIONS

SAE Technical Paper Series 830302, R. G. J. Flay et al., "Slotted-Wall Test Section for Automotive Aerodynamic Tests at Yaw"; 1983 Mar.

DSMA International Inc., S. Raimondo and P. J. F. Clark, "Slotted Wall Test Section for Automotive Aerodynamic Test Facilities", 1982.

Primary Examiner—Joseph A. Orsino
Assistant Examiner—Brent Swarthout
Attorney, Agent, or Firm—Kenyon & Kenyon

[57] ABSTRACT

An environmental wind tunnel facility for automotive vehicles, such as passenger cars, is provided with a slotted-wall extension which improves the air flow simulation over the entire vehicle and enables a reduction in the physical size of the environmental wind tunnel.

29 Claims, 11 Drawing Sheets

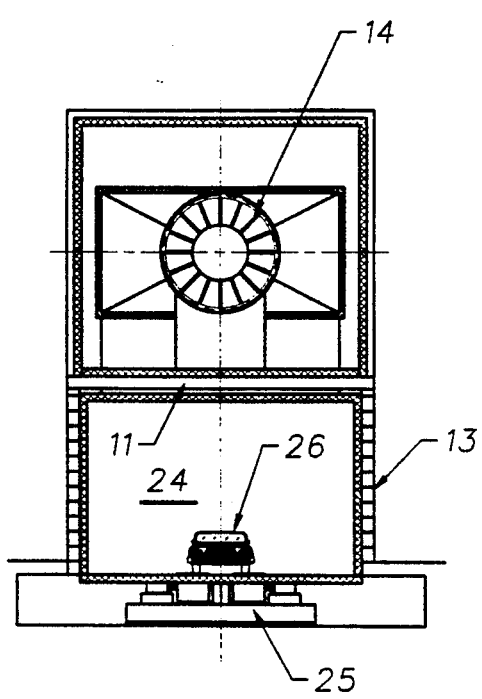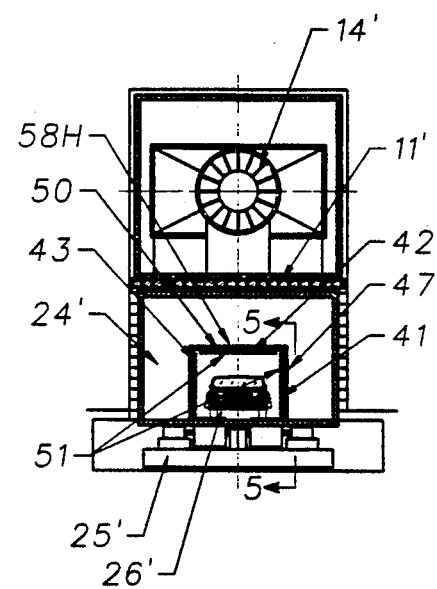
FIGURE 2
FIGURE 4

SLOTTED-WALL EXTENSION AND METHOD FOR ENVIRONMENTAL WIND TUNNELS

BACKGROUND AND BRIEF DESCRIPTION OF THE INVENTION:

Automotive wind tunnel testing can be broadly divided into two categories: aerodynamic and environmental. Aerodynamic tests aim at duplicating the pressure field on the vehicle exterior, and include evaluating the resultant forces and moments acting on the vehicle. Since the local pressure is proportional to the square of the velocity, errors in the velocity distribution of the simulated flow field can have a significant effect on the test results, and velocity errors in the simulation must be maintained at very low levels. Environmental (or climatic) tests aim at simulating automobile heating and cooling characteristics, and include developmental work on the cooling system, on the HVAC system, and on the reliability of engine mechanical and electronic components under sustained high temperature operation. Since the convective heat flux is proportional to the velocity raised to the 0.8 power, the effect of an error in the local velocity of the simulated flow field is less significant, and consequently greater velocity deviations are acceptable during climatic tests. For this reason, environmental tunnels are built with smaller nozzle exit areas than aerodynamic tunnels, with testing conducted at higher blockage and with larger errors in the local velocity over the vehicle.

Many of the existing environmental test facilities use high blockage, open jet test sections, and can only simulate the air flow at the very front of the vehicle, i.e., at the radiator grill, to an acceptable accuracy. The quality of the flow simulation over the vehicle then rapidly deteriorates as the unconstrained flow undergoes a large over expansion. As a result, the air flow simulation around the vehicle becomes inadequate.

The objects of the present invention are to provide an improved environmental automotive wind tunnel, more particularly an environmental automotive wind tunnel with improved simulation of air flow around a vehicle and to enable a reduction in the physical size of the wind tunnel.

In accordance with the invention, a slotted wall extension to the nozzle exit area is positioned over a vehicle to constrain the air flow around the vehicle and improve the simulation up to the rear of the vehicle.

Addition of the slotted-wall extension to the open jet considerably improves the air flow simulation over the entire vehicle in environmental wind tunnels, even at large blockage.

As disclosed herein, the extension comprises a three-sided, structure with vertical side walls and a horizontal top wall. In a preferred embodiment, the extension is approximately 1.45 to 1.5 vehicle lengths (LC) long, and has aerodynamically spaced longitudinal slots. However, longer and shorter lengths or slotted-walls may be used with equivalent good results. The slotted-wall extension is mounted on wheels or casters so that it can be rolled into position over the passenger car being tested, with the upstream end butted up against the exit of the wind tunnel nozzle and the downstream end proximate the rear of the passenger car. The slots on the extension walls constrain the air flow around the vehicle and improve the simulation up to the rear of the vehicle. The slotted-wall extension can be rolled out of place when not in use.

BRIEF DESCRIPTION OF THE DRAWINGS

The above and other objects, advantages and features of the invention will become more apparent when considered with the following specification and accompanying drawings wherein:

FIG. 2 is a sectional view taken on lines 2—2 of FIG. 1, FIG. 4 is a sectional view taken on lines 4—4 of FIG. 3.

DETAILED DESCRIPTION OF THE INVENTION

Figure 1:
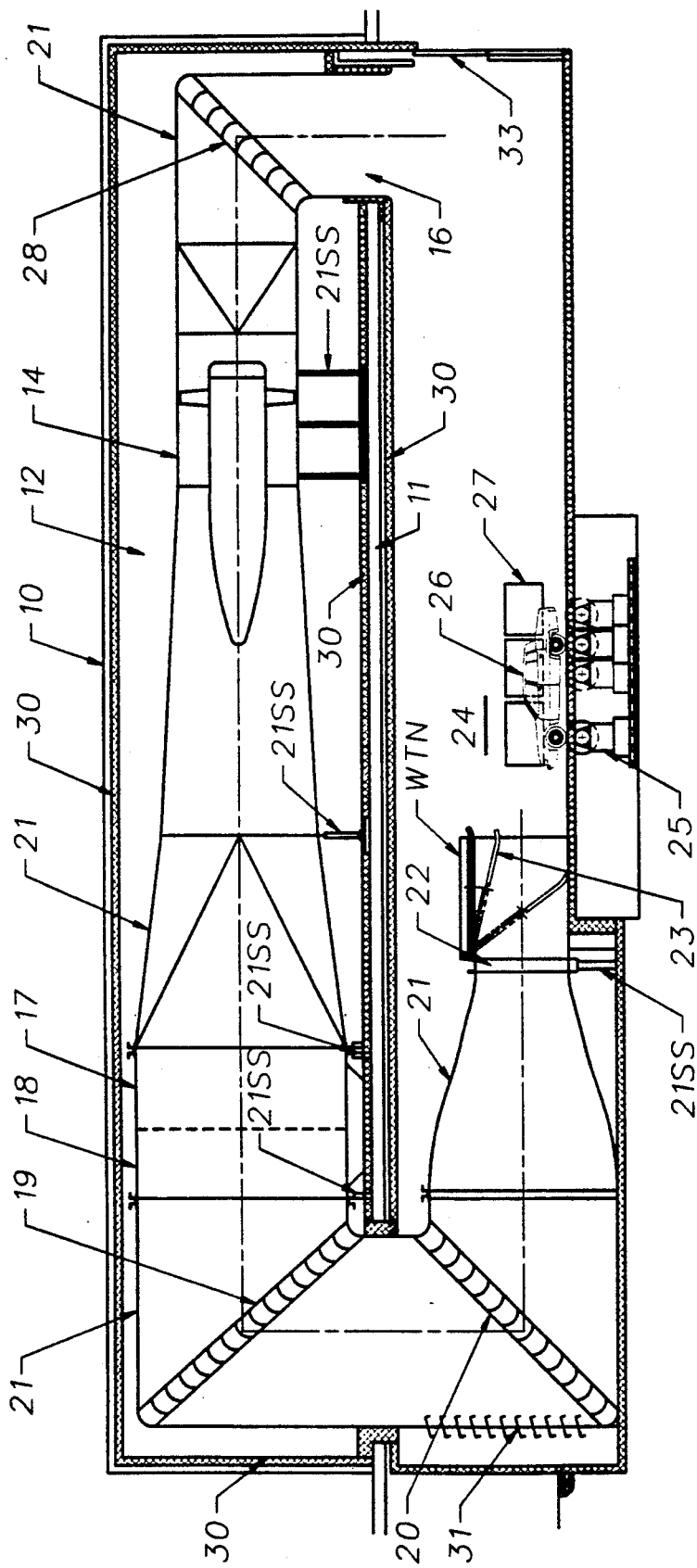
FIG. 1 is a sectional elevational view of a prior art environmental automotive wind tunnel or test facility.

Referring first to the prior art environmental wind tunnel facility (shown in FIGS. 1 and 2) for simulating air flow over a automotive vehicle, this environmental wind tunnel includes a building 10 which is divided by a ceiling partition 11 into an upper conditioned air source section 12 and a lower test chamber section 13. Air from turbine or blower 14 is guided through a conditioning section which may include a heat exchanger 17 and steam injection unit 18 to establish the climatic conditions of air flowing over the vehicle. Guide vanes 19 and 20 guide the conditioned air in the duct work 21 leading to a conventional honeycomb frame 22 and controllable vane 23 to the test chamber 24 where the vehicle is positioned on testing dynamometer and rolls 25 with a test vehicle 26 positioned in front of control room windows 27. Duct work 21 is supported on duct work support stands 21SS. The air may be returned to the turbine 14 via further duct work 16 and guide vanes 28. Insulation 30 is provided where needed in the facility. By-pass louvers 31 may likewise be provided. The vehicle 26 is introduced into the test chamber 24 through insulated doors 33. Although the turbine or blower and related duct work is shown as positioned over the test chamber, it will be appreciated that these units may be on the same plane but this vertical assembly is preferred. The dimensions given are exemplary.

THE PRESENT INVENTION

Figure 3:
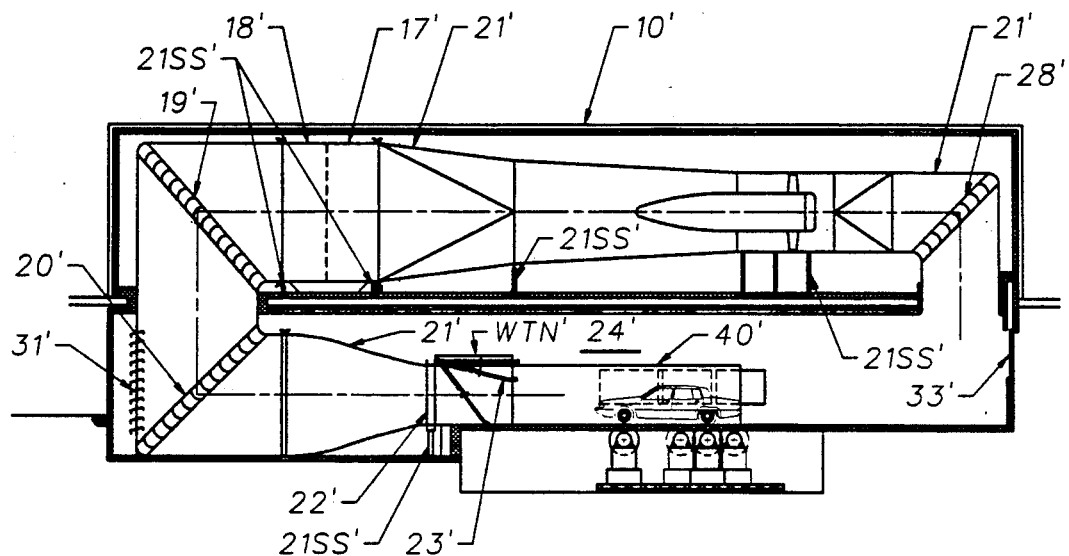
FIG. 3 is a sectional elevational view of an environmental automotive wind tunnel or test facility incorporating the slotted-wall extension of the present invention and showing the general scale proportion reduction in size corresponding to the prior art test facility shown in FIG. 1.
Figure 5:
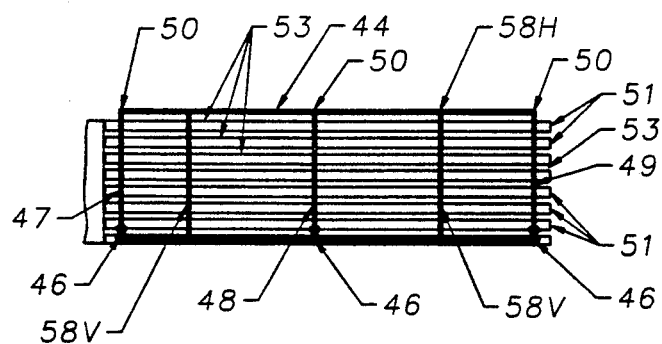
FIG. 5 is a side elevational view of the slotted-wall extension according to the invention and taken on lines 5—5 of FIG. 4, FIGS. 6a, 6b and 6c provide a comparison of pressure coefficients between an automobile traveling through free air (FIG. 6a), an automobile installed with a slotted-wall extension (FIG. 6b), and an automobile installed within a test field such as shown in FIG. 1 with a large contraction (conventional open jet) without the slotted-wall extension (FIG. 6c)
Figure 6A:
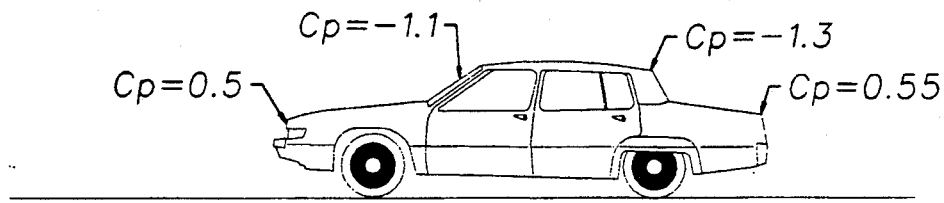
Figure 6B:
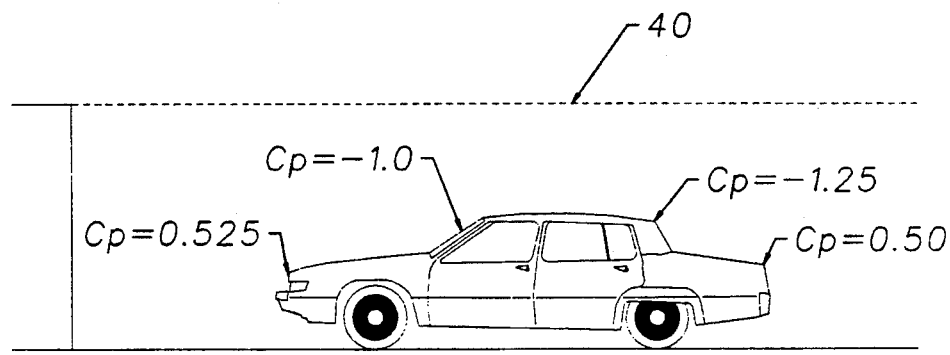
Figure 6C:
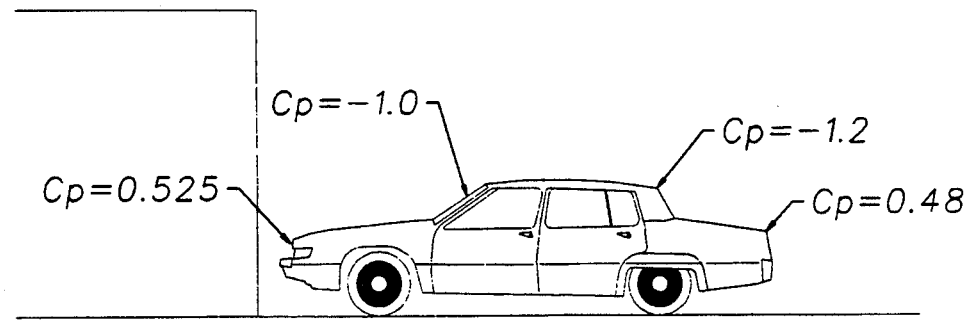
Figure 7:
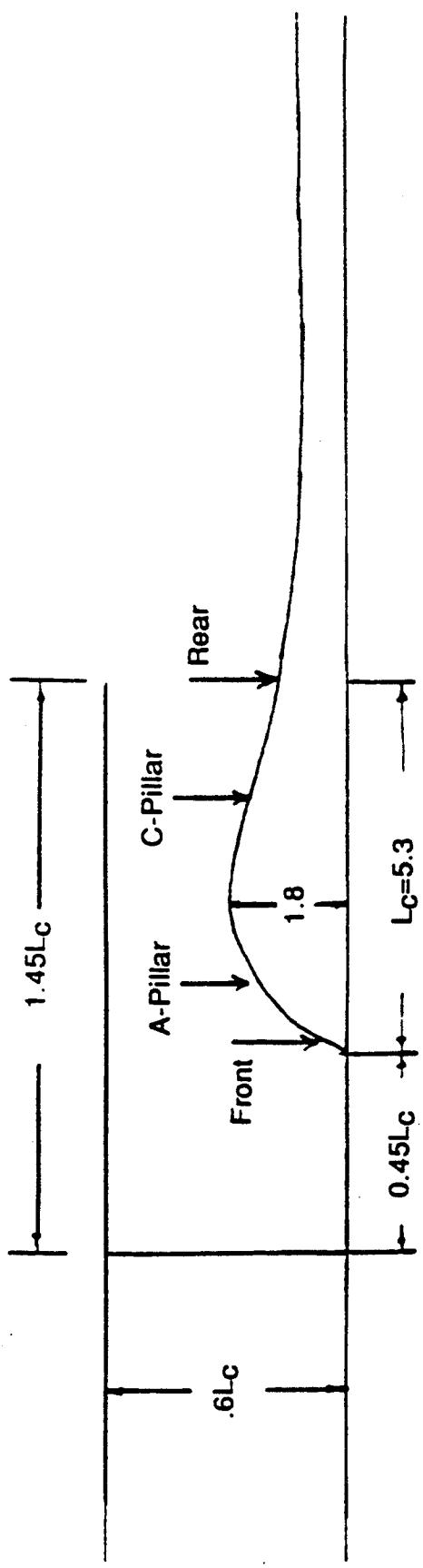
FIG. 7 illustrates the computational geometry used for a slotted-wall extension which is 1.45 times the length of the vehicle with the vehicle positioned such that its front end was 0.45 vehicle lengths downstream of the nozzle to correspond to a vehicle blockage of approximately 40%.

Referring now to FIGS. 3, 4 and 5, the environmental wind tunnel has, except for the slotted-wall extension 40 and the reduced or smaller size components, essentially the same elements as shown in FIGS. 1 and 2 and these are identified with the primed numerals. The invention is concerned with the added slotted-wall extension 40 which is shown in detail in the side elevation of FIG. 5. The slotted-wall extension assembly shown in FIGS. 3, 4 and 5 has three sides 41, 42 and 43 with two vertical side walls 41, 43 and a top horizontal wall 42. A support frame 44 is provided with wheels or casters 46 at the lower ends of the front, middle and rear vertical risers 47, 48 and 49, there being a similar set of vertical risers on the opposite side of the frame which are joined by horizontal cross members 50. A plurality of elongated slot or plate members 51 are spacedly secured to vertical risers 47, 48 and 49 and equal spaced so as to provide a plurality of longitudinal slots 53, which extend for the length of the slotted-wall extension 40. Intermediate vertical risers 58V and horizontal bars 58H stiffen the longitudinal slot members 51. In a preferred embodiment, the slots or plate members are equidistantly spaced but the invention includes embodiments wherein the slots or plate members are not evenly spaced, and where the plate or slots are not rectangular and the resulting slots are not rectangular. The dimensions given are exemplary.

While the slotted-wall extension device shown in FIGS. 3, 4 and 5 is rectangular in cross-section, it will be appreciated that instead of vertical and horizontal walls, the slotted-wall extension device of this invention may be a single arcuate curve or consist of a plurality of adjoining straight segments to form portions of hexagons, pentagons, or the like. As shown in FIG. 3, slotted-wall extension 40 is rolled on wheels or casters 46 into position over the car being tested with the upstream end butted up against the exit of the wind tunnel nozzle WTN.

The design of the slotted-wall extension was based on a two-dimensional stream function vorticity code which has a slotted wall boundary condition. The constant in the slotted-wall boundary condition was calibrated using published data on aerodynamic slotted-wall wind tunnels, and reproduced trends in the experimental data to a high degree.

Figure 8:
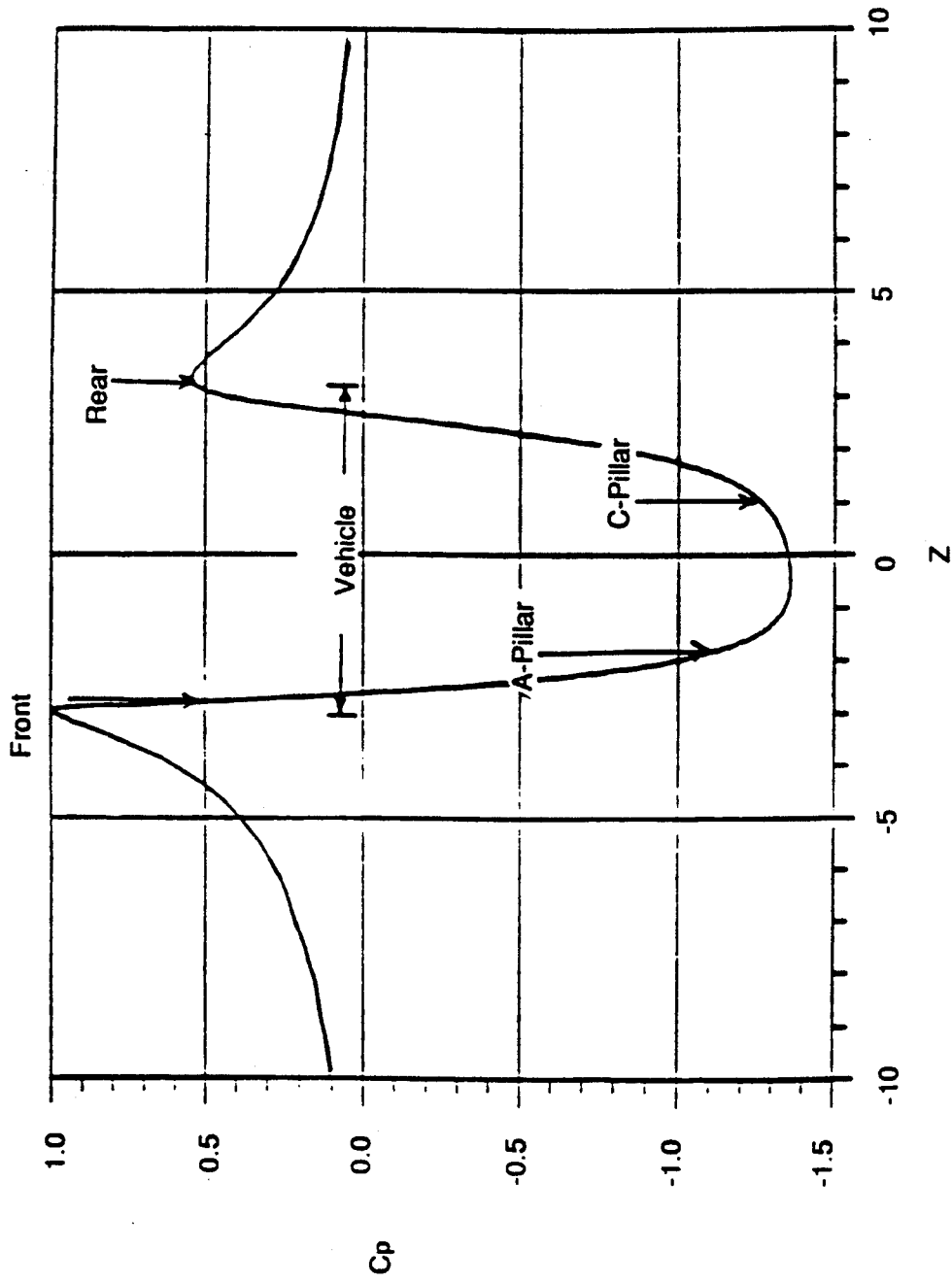
FIG. 8 is a graph showing an interference-free pressure distribution around the vehicle.
Figure 9:
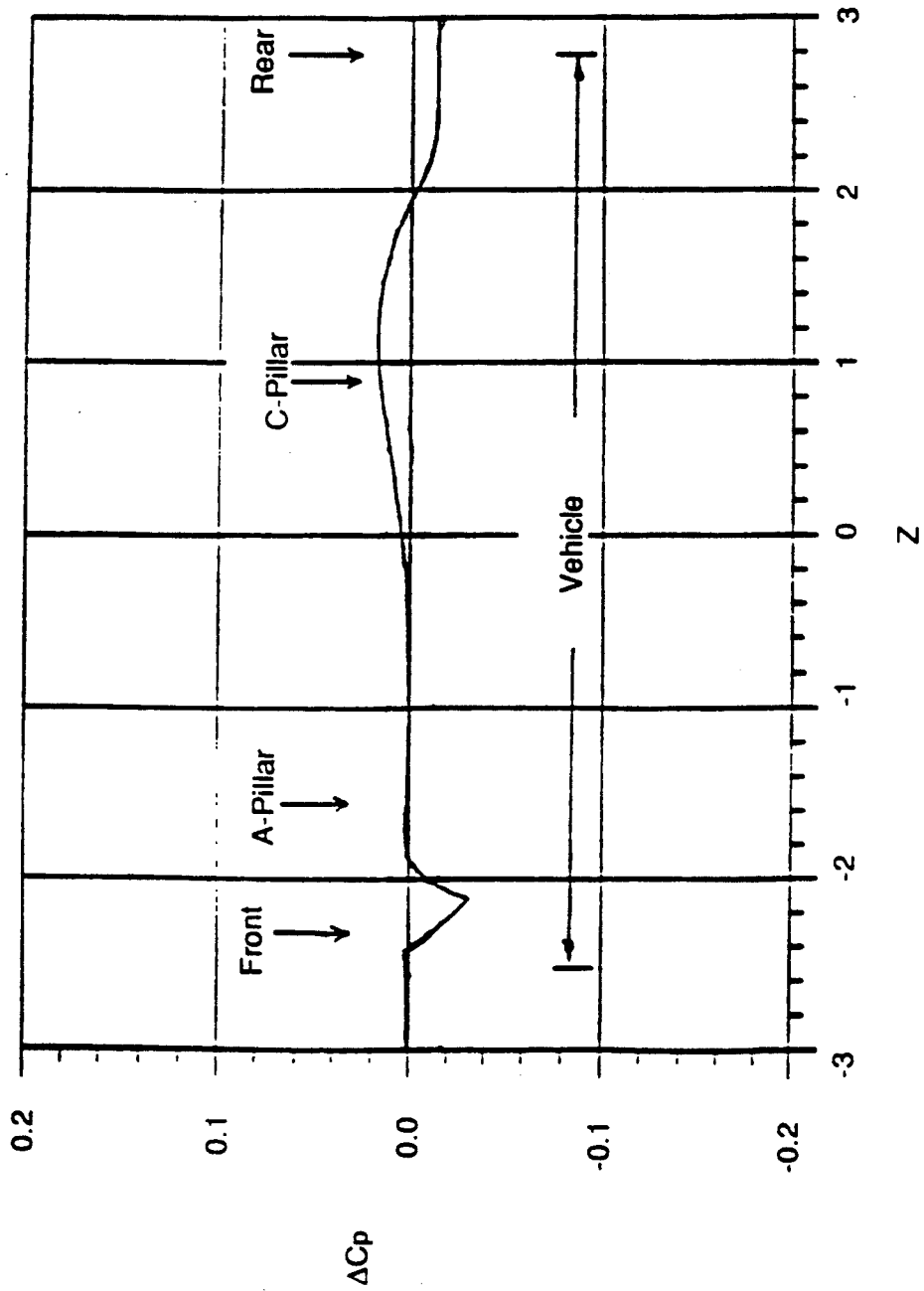
FIG. 9 is a graph illustrating the vehicle pressure simulation error where the slotted-wall extension has a length approximately 1.45 the length of the vehicle LC and the vehicle blockage is approximately 30%.
Figure 10:
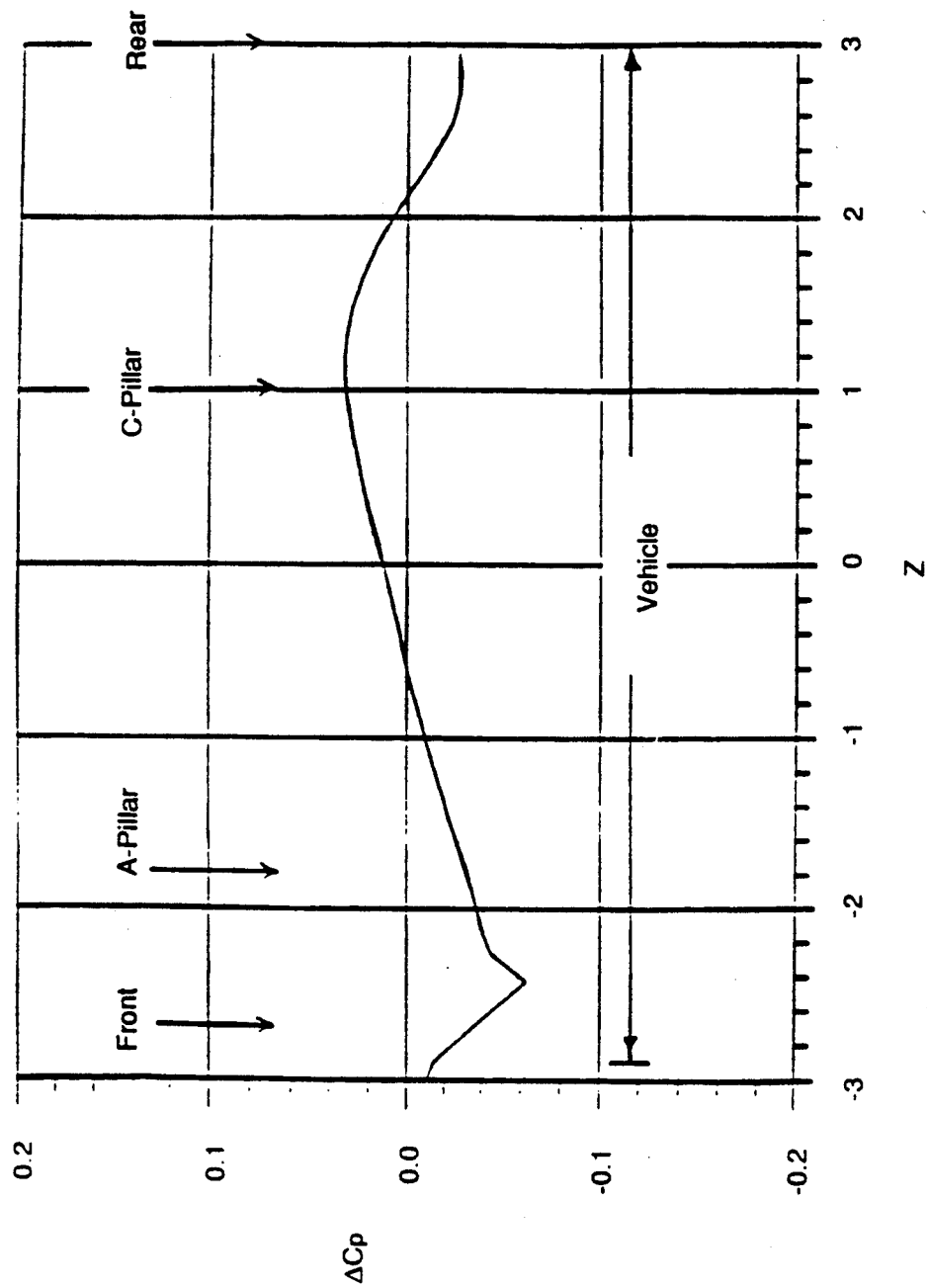
FIG. 10 is a graph similar to FIG. 9 illustrating the vehicle blockage at 40%.
Figure 11:
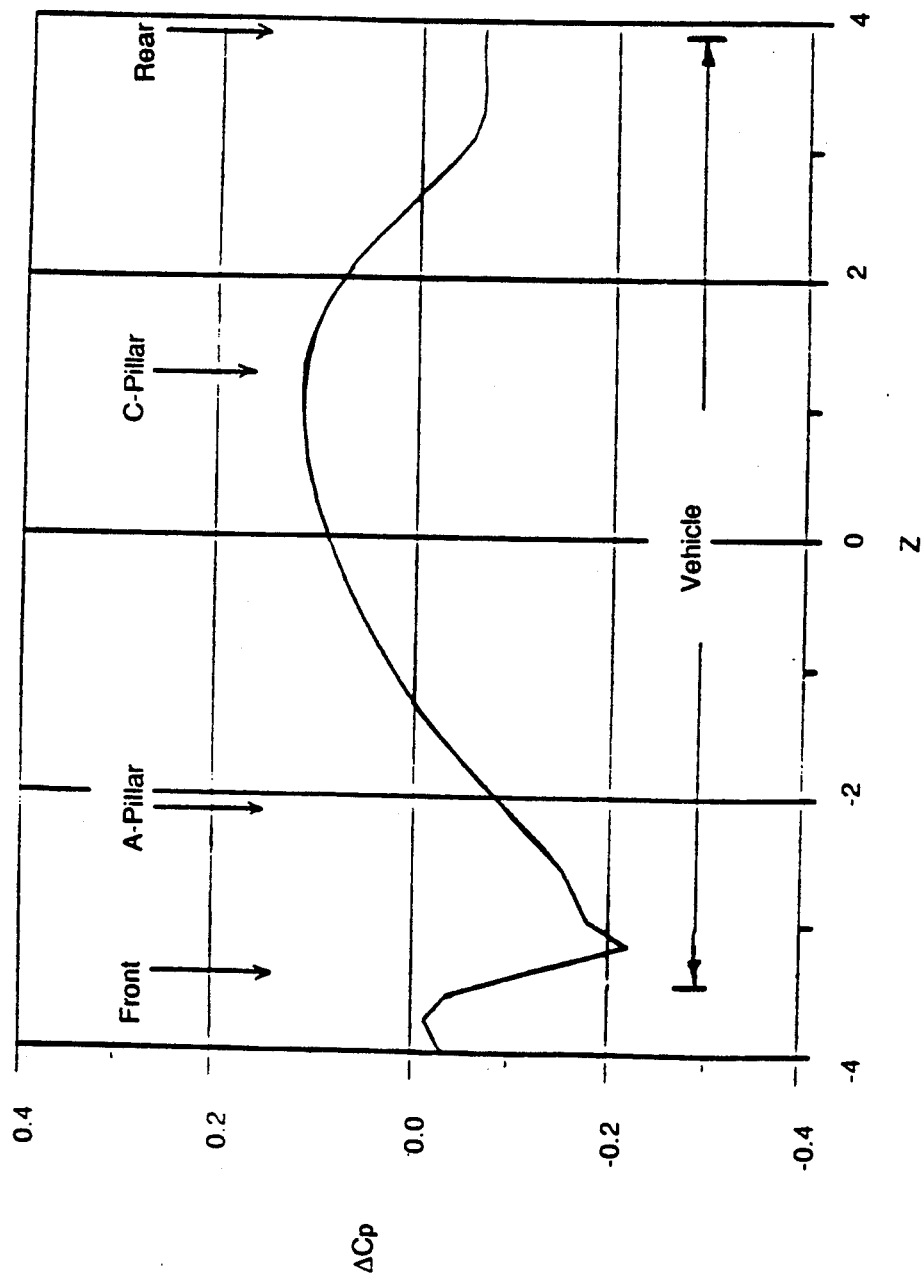
FIG. 11 is a graph similar to FIG. 9 showing the vehicle blockage at approximately 60%.
Figure 12B:
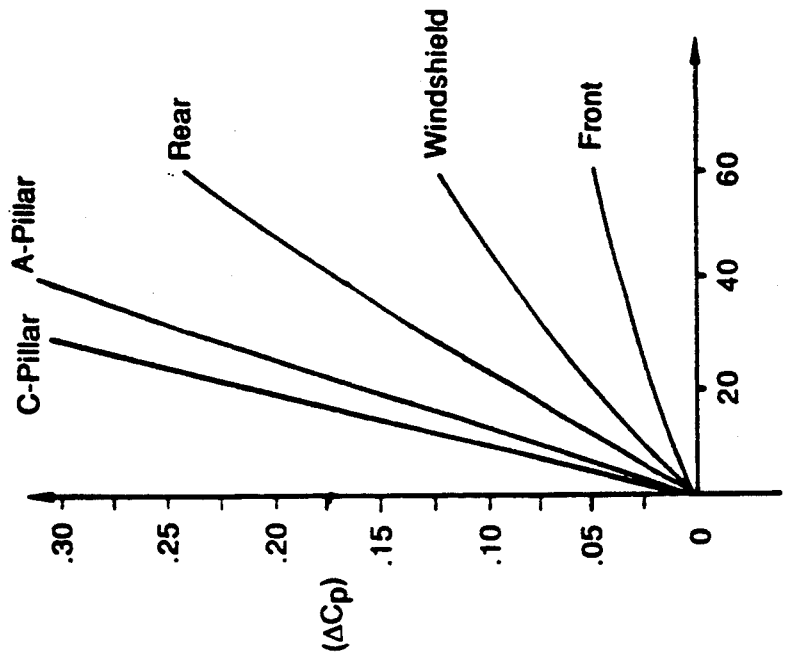
FIGS. 12a and 12b show a vehicle pressure simulation error as a function of blockage for the slotted-wall extension and for an open jet test, respectively.
Figure 12A:
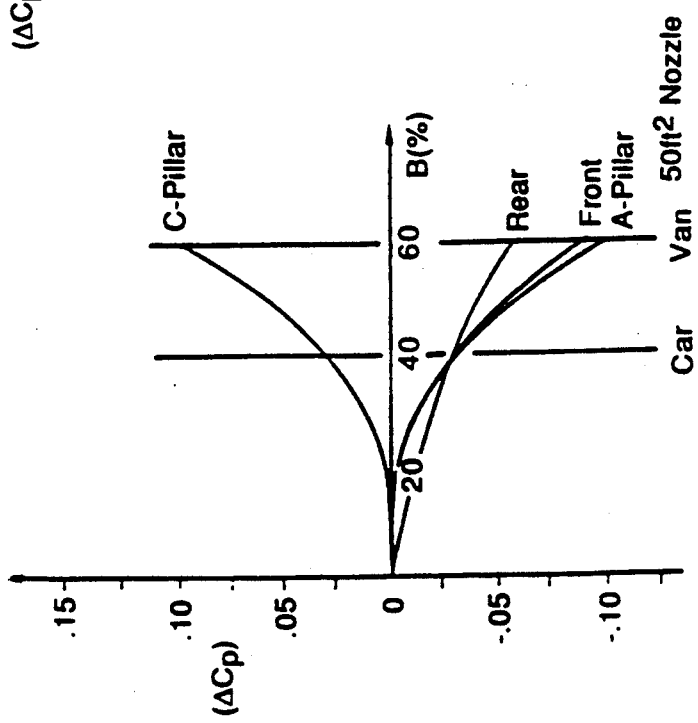
Figure 13B:
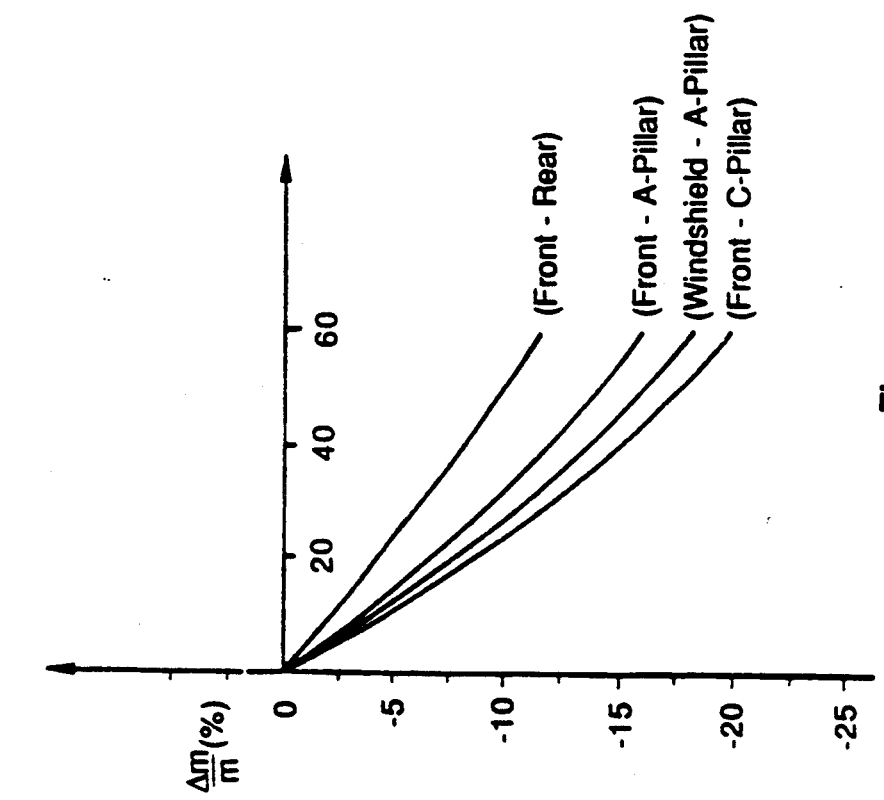
FIGS. 13a and 13b are two graphs illustrating respectively, the mass flow simulation error as a function of blockage for the slotted-wall extension and for open jet tests.
Figure 13A:
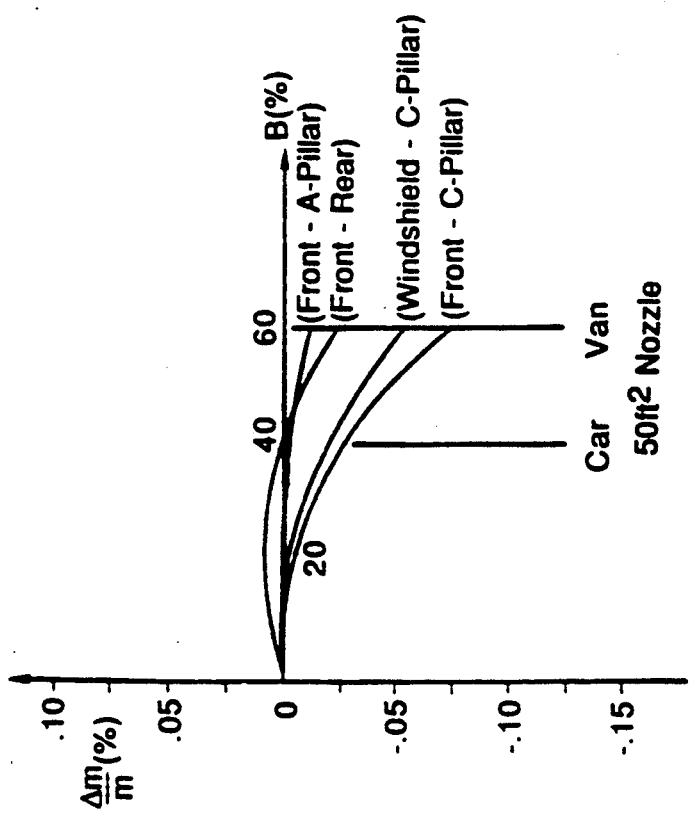

The vehicle was modeled with a doublet plus a wake source. The exact, interference-free pressure distribution around this body is shown in FIG. 8. The vehicle in this figure extends from $Z=-2.9$ to $Z-3.2$. As the flow in the test section approaches the vehicle, the pressure increases. A stagnation point at which the velocity is zero and the pressure coefficient is 1.0 forms at the nose of the vehicle. The pressure then drops sharply as the flow accelerates over the body, and a minimum pressure results around $Z=0.0$. The pressure again increases as the flow decelerates over the rear of the body. Since the localized high pressure region of the windshield is not represented by this modeling approach, adjustments were made to the pressure field when evaluating windshield phenomena.

The constant in the slotted-wall BC was varied so as to obtain the best match with the interference-free pressure distribution. It was found that the best results were obtained with the same constant that was used for the aerodynamic analysis. This implies the slot geometry is the same as that used for aerodynamic wind tunnels.

The pressure simulation error around the vehicle was then computed. Several different vehicle blockages ranging from 16 to 60% were considered. The vehicle pressure simulation error, the pressure correction due to blockage, as well as the corrected error are indicated in FIGS. 10 to 16. As expected, larger simulation errors are obtained as the vehicle blockage is increased. However, the error magnitudes even as far back as the vehicle rear are well below those that would be obtained during conventional open jet tests.

In order to assess the effect of the flow simulation errors on the engine compartment and HVAC flows, the error in the pressure across different vehicle stations was determined as a function of blockage. The results are presented in FIG. 12a, along with the corresponding estimated errors for open jet tests shown in FIG. 12b. The significance of the different vehicle stations considered is indicated in Table 1. The following inferences can be drawn from an inspection of FIGS. 12a and b:

1. The pressure errors over the vehicle front and up to the windshield during conventional open jet tests are small as expected ($\Delta C_p max \sim 0.1$). However, the pressure errors in the rear half of the vehicle are 0.2 to 0.4 for blockage up to 50%.
2. The pressure errors over the front part of the automobile during tests with the slotted-wall extension are about the same as those obtained during conventional open jet tests for equivalent blockage. However, there is considerable improvement in the pressure simulation over the rear half of the vehicle.

The error in the mass flow simulation through a vehicle compartment is proportional to the square root of the pressure differential across its inlet and outlet locations. Therefore, the error in the mass flow simulation is approximately half that of the error in the pressure differential. The mass flow errors resulting from the pressure errors of FIGS. 12a and b are presented in FIGS. 13a and b.

The mass flow error is considerably higher for conventional open jet tests, approaching 20% for 40-50% blockage. The mass flow error in today's engine cooling flows (Front - A pillar) is about 15% for open jet tests, and this error would increase to about 20% if the cooling flow exits are located at the C-pillar which may represent tomorrow's design. By comparison, the mass flow error is limited to about 5% with the slotted-wall extension.

The following Table sets out the significance of pressure differential across different vehicle stations:

TABLE 1

| Stations | Significance |
| --- | --- |
| Front - A-Pillar | Today's engine cooling |
| Front - C-Pillar | Tomorrow's engine cooling |
| Front - Rear | Tomorrow's engine cooling |
| Windshield - C Pillar | Today's Interior HVAC flow |

It has been demonstrated that the slotted-wall extension of this invention improves the vehicle air flow simulation over the rear half of the vehicle in environmental wind tunnels with an attendant reduction in the physical size of the wind tunnel resulting in lower costs. A slotted extension of 1.45 vehicle lengths (based on a 40% blockage vehicle) is determined to be adequate, and gives a mass flow simulation accuracy within 5% for vehicle blockages up to 60%. The geometry of the slots is similar to that used in existing, aerodynamic automotive wind tunnels.

The slotted-wall extension is portable, and can be conveniently rolled into use when desired. For this reason, it can readily be used to supplement conventional open jet tests.

It will be appreciated that while the slottted-wall extension of the present invention produces a significant improvement in flow quality in situations when the test article produces a high percentage blockage of the wind tunnel nozzle, and by using the invention a wind tunnel can be built smaller than would otherwise be required, the slotted-wall extension can be used with conventional-sized environmental wind tunnels to improve flow quality in a similar fashion.

It will be apparent that the embodiments disclosed herein are exemplary and that various modifications can be made in construction and arrangement within the scope of the invention as defined in the appended claims.

What is claimed is:

1. In an environmental wind tunnel for air flow over an automotive vehicle simulating vehicle heating and cooling characteristics, said wind tunnel having a source of air under pressure and an elongated housing for receiving an automotive vehicle and having an upstream end coupled to the downstream end of said source of air under pressure and its downstream end connected to the upstream end of said source of air under pressure, air from said source of air under pressure flowing axially through the housing from its upstream end to its downstream end, the improvement comprising:

a slotted-wall extension disposed within said housing and having a plurality of rigid walls generally parallel to the direction of air flow through said housing positioned to surround an automotive vehicle within said housing, one or more of said walls being formed with elongated slots therein for correcting air flow over the exterior of the automotive vehicle, said walls being fixedly mounted with respect to each other, said walls enclosing a space within said walls in which an automotive vehicle can be placed, the cross sectional area of said space enclosed by said walls being 1.67 to 3.33 times the cross sectional area of the automotive vehicle.

2. The environmental wind tunnel defined in claim 1 wherein said downstream end of said source of air includes a nozzle having an exit end and said slotted-wall extension has an upstream end which is butted to the exit end of said nozzle.

3. The environmental wind tunnel defined in claim 2 wherein said one or more of said walls comprises a support frame and a plurality of elongated slats fixedly supported in space relation on said support frame, said slats forming said slots therebetween.

4. The invention defined in claim 3 wherein said slats are equidistantly spaced from each other.

5. The environmental wind tunnel defined in claim 3 further comprising means mounted on said frame for movably supporting said frame and slats for movement into and out of said housing.

6. The environmental wind tunnel defined in claim 1 wherein the number of said walls is three, two of said walls being vertical and spaced parallel to each other, the third wall being horizontal and joining the tops of the two vertical walls, each said vertical and horizontal wall comprising fixedly spaced horizontal slats defining said elongated slots therebetween.

7. In an environmental wind tunnel for simulating air flow over an article for simulating heating and cooling characteristics on said article, said tunnel having:

a source of air under pressure, and
a housing for receiving and supporting an article and having an upstream end coupled to the downstream end of said source of air under pressure such that air flow is from said source toward one end of the article and exits through an exit opening in the housing positioned to the rear of an opposite end, the improvement comprising:
a slotted-wall extension disposed within said housing and having a plurality of rigid walls generally parallel to the direction of air flow through said housing, said slotted-wall extension enclosing said article within and spaced from said housing, one or more of said walls being formed with fixedly spaced elongated slots therein for correcting air flow over the exterior of the article wherein the article has a cross-sectional area which blocks between 30 and 60 percent of the cross-sectional area of the space enclosed by the walls and the extension having a length which is at least about 1.4 times the length of said article.

8. The environmental wind tunnel defined in claim 7 wherein said source of air includes a duct work coupled to a nozzle exit area, and said slotted-wall extension butts-up against said nozzle exit area.

9. The environmental wind tunnel defined in claim 7 wherein said one or more of said walls comprises a support frame and a plurality of elongated slats spacedly mounted in fixed relation on said support frame.

10. The enviromental wind tunnel in claim 9 wherein said slats are fixedly mounted on said frame parallel to the direction of air flow in said housing.

11. The environmental wind tunnel defined in claim 10 further comprising means mounted on said frame for movably supporting said frame and slats for movement into and out of said housing.

12. The environmental wind tunnel defined in claim 7 wherein the number of walls is three, two of said walls being vertical and fixedly spaced parallel to each other, the third wall being horizontal and fixedly joining the tops of the two vertical walls, each said wall comprising fixedly spaced slats defining therebetween slots elongated in the direction of air flow.

13. A method of reducing the size and enhancing the simulation effect of an environmental wind tunnel for simulating air flow over an automotive vehicle, said wind tunnel having a source of air under pressure, an elongated housing portion forming a part of a substantially closed air flow loop, means for treating air flowing in said loop to achieve predetermined climatic conditions in air flowing over in said loop, the improvement comprising: placing a flow correcting slotted-wall extension having a plurality of walls generally parallel to the direction of air flow through the housing in said elongated housing portion having a predetermined length greater than the length of a vehicle under test and a predetermined cross-sectional area so that said automotive vehicle blocks between 30 and 60 percent of the cross-sectional area of said slotted-wall extension, said slotted-wall extension enclosing said automotive vehicle within and spaced from said housing.

14. The method defined in claim 13 Wherein said slotted-wall extension comprises a plurality of elongated, generally planar slats spacedly disposed in fixed relation to define therebetween elongated slots.

15. A method of improving the preformance of an environmental wind tunnel having a source of climatically conditioned air under pressure, an elongated housing portion forming a part of a substantially closed air to flow loop, and an exit nozzle supplying said air flow over an automotive vehicle, comprising the steps of:
  (1) providing a slotted-wall extension having a plurality of rigid walls generally parallel to the dimension of air flow through the housing and having a length greater than the length of the vehicle being tested and a cross-sectional area between 1.67 and 3.33 times the cross-sectional area of the vehicle being tested, and
  (2) positioning said slotted-wall extension spaced from said housing and totally over said vehicle with the front of the vehicle being spaced from said exit nozzle a predetermined distance.

16. The method defined in claim 15 wherein said slotted-wall extension has an upstream end and is on wheels and is rolled into position with said upstream end in abutment with said exit nozzle.

17. In an environmental wind tunnel for air flow over an automotive vehicle simulating vehicle heating and cooling characteristics, said wind tunnel having a source of air under pressure with an upstream end receiving air and a downstream end and an elongated housing for receiving an automotive vehicle and having an upstream end coupled to said downstream end of said source of air under pressure, air from said source of air under pressure flowing axially through the housing from its upstream end to its downstream end, the improvement comprising:
  a slotted-wall extension disposed within said housing and having a plurality of rigid walls generally parallel to the direction of air flow through said housing positioned to surround an automotive vehicle within said housing, one or more of said walls being formed with elongated slots therein for correcting air flow over the exterior of the automotive vehicle, said walls being fixedly mounted with respect to each other, said walls enclosing a space within the walls in which an automotive vehicle can be placed, the cross sectional area of the space enclosed by said walls being between 1.67 and 3.33 times the cross sectional area of the automotive vehicle.

18. The environmental wind tunnel defined in claim 17 wherein the downstream end of said source of air includes a nozzle with an exit end and said slotted-wall extension has an upstream end which is butted to the exit end of said nozzle.

19. The environmental wind tunnel defined in claim 18 wherein said slotted-wall extension includes a support frame and a plurality of elongated slats fixedly supported in aerodynamically spaced relation on said support frame and slots formed between said slats.

20. The environmental wind tunnel defined in claim 19 wherein said slats are equidistantly spaced from each other in fixed relation.

21. The environmental wind tunnel defined in claim 19 wherein said frame includes means for movably supporting said frame and slats for movement into and out of said housing.

22. The environmental wind tunnel defined in claim 17 wherein the number of walls is three, two of said walls being vertical and fixedly spaced parallel to each other, the third wall being horizontal and joining the tops of the two vertical walls, each said wall comprising fixedly spaced horizontal slats defining therebetween said elongated slots.

23. The environmental wind tunnel defined in claim 5 wherein said supporting means comprise wheels.

24. The environmental wind tunnel defined in claim 11 wherein said supporting means comprise wheels.

25. An extension for an environmental wind tunnel in which an article to be tested can be placed, and through which air from the wind tunnel can flow,
  said extension comprising a plurality of rigid walls fixedly disposed generally parallel to an axis and being joined at their parallel edges, and said extension having an upstream open end and a downstream open end, said axis running through said open ends,
  said walls enclosing a space within the walls in which an article to be tested can be placed,
  at least one of said walls have formed therein a plurality of elongated slots parallel to said axis,
  said elongated slots providing fluid communication between the space enclosed by said walls and the space outside said walls,
  the cross sectional area of the space enclosed by said walls being between 1.67 and 3.33 times the cross sectional area of the article to be tested,
  said walls having a length that is a predetermined multiple of the length of the article to be tested.

26. The extension defined in claim 25 wherein each wall comprises a plurality of elongated slats arranged in fixed relation and forming therebetween said elongated slots.

27. The extension defined in claim 26 wherein the number of walls is three, two of said walls being vertical and fixedly spaced parallel to each other, the third wall being horizontal and joining the tops of the two vertical walls.

28. The extension defined in claim 27 wherein the ratio of the length of said walls to the length of the article to be tested is between 1.0 and 2.0.

29. The extension defined in claim 28 further comprising means for movably supporting said walls for movement.

* * * * *